(12) United States Patent
King

(10) Patent No.: US 7,284,763 B1
(45) Date of Patent: Oct. 23, 2007

(54) PORTABLE STORAGE CONTAINER ASSEMBLY

(76) Inventor: Kelly King, 25634 Equestrian Ct., Shorewood, IL (US) 60431

( * ) Notice: Subject to any disclaimer, the term of this patent is extended or adjusted under 35 U.S.C. 154(b) by 127 days.

(21) Appl. No.: 11/240,713

(22) Filed: Sep. 30, 2005

Related U.S. Application Data

(60) Provisional application No. 60/614,507, filed on Sep. 30, 2004.

(51) Int. Cl.
 *B62B 1/00* (2006.01)
 *A45C 5/14* (2006.01)
(52) U.S. Cl. .............................. 280/47.26; 280/47.24; 280/47.131; 280/47.17; 280/47.315; 280/47.33; 280/47.35; 280/47.34; 280/37; 190/18 A
(58) Field of Classification Search ............. 280/47.26, 280/47.24, 47.131, 47.17, 47.315, 47.33, 280/37, 47.35, 47.34; 190/18 A
See application file for complete search history.

(56) References Cited

U.S. PATENT DOCUMENTS

| | | | |
|---|---|---|---|
| 5,518,139 A | | 5/1996 | Trower |
| 6,047,976 A | * | 4/2000 | Wang .................... 280/47.315 |
| 6,311,991 B1 | * | 11/2001 | Conrado et al. ......... 280/47.26 |
| 6,364,329 B1 | * | 4/2002 | Holub et al. ............. 280/47.26 |
| 6,601,930 B2 | | 8/2003 | Tiramani et al. |
| 6,761,366 B1 | * | 7/2004 | Klemmensen et al. ... 280/47.26 |
| 6,761,367 B2 | * | 7/2004 | Fite .......................... 280/47.26 |
| 2002/0030425 A1 | * | 3/2002 | Tiramani et al. ............ 312/108 |
| 2004/0232637 A1 | * | 11/2004 | Butler ...................... 280/47.26 |

OTHER PUBLICATIONS

Article entitled "Stanley Metal Rolling Workshop" appearing on www.homedepot.com website.
RedHead Hunting Master Catalog 2004.
Cabela's Archery 2004 Catalog.

* cited by examiner

*Primary Examiner*—Christopher P. Ellis
*Assistant Examiner*—John R. Olszewski
(74) *Attorney, Agent, or Firm*—Patzik, Frank & Samotny Ltd.

(57) ABSTRACT

A portable storage container assembly having a bottom container, a top container and a cover, wherein the bottom and top containers may be selectively and individually accessed through the use of a sliding latch member that engages one or more of a series of male members or flanges associated with the bottom container, top container and cover. A locking member may be attached to the latch and a male member to secure the containers in the closed position. Additional storage may be provided through a storage tray accessible from the outside of the bottom container or through a covered recessed area in the cover. The top container may include a pair of stand members for permitting a bow or other elongated devices to be stored.

21 Claims, 4 Drawing Sheets

PORTABLE STORAGE CONTAINER ASSEMBLY

This application claims priority to U.S. provisional patent application Ser. No. 60/614,507 filed Sep. 30, 2004.

FIELD OF THE INVENTION

This invention relates in general to portable storage container assemblies, and more particularly, to portable storage container assemblies that have multiple compartments that may be selectively opened.

BACKGROUND OF THE INVENTION

Hunters, especially bow hunters, often need to transport a lot of equipment and supplies to a particular hunting location. Known carrying cases or containers include duffel bags that permit a bow and arrows to be stored in zippered compartments, or hard carrying cases that only permit bows and arrows to be stored in a hand-held case. While these carrying items may work to a certain degree, the duffel bags are not considered optimal in that they do not provide easy access to the contents or a very secure container to protect the contents from being damaged. Moreover, the hard cases do not permit the hunter to transport any additional items or equipment in the same container. Furthermore, neither the duffel bags nor the hard cases typically provide for any means to store all gear necessary for a bow hunter or the bow in a ready position to permit the hunter to have quick access to the bow. The known carrying cases or containers also generally do not include any means to dissipate odors from or add scent to the equipment when it is stored.

Therefore, there is a need to produce a portable storage assembly that provides secure storage for a hunter's bow, arrows and other equipment, while being economical and easy to manufacture and use. There is also a need to produce a portable storage container assembly that provides a stand to permit the hunter to have ready access to a bow. Yet another need is to provide a portable storage assembly that includes means to add scent to the equipment after use. A further need is to produce a portable storage container assembly that is easy and quick to use.

SUMMARY OF THE INVENTION

The present invention is an improvement over the prior storage container assemblies in that the way that the portable storage container assembly allows for multiple compartments or containers to be selectively accessed and, in the embodiment for hunters, in the way that the assembly allows for the facilitated storage and placement of a bow and other equipment are unique and improvements over the prior art. In particular, one embodiment of the storage container assembly includes a bottom container having a pair of wheels and a handle; a cover; and a top container that may be selectively accessed through the use of a pair of sliding latch members that engage one or more of a series of male members or flanges that are associated with the bottom container, top container and cover for the top container. In a first position, the latch members engage male flange members that are attached to the bottom container and the top container to permit the cover to be rotated to provide access to the contents of the top container. In a second position, the latch members engage male flange members on the top container and cover to permit access to the contents of the bottom container. Moving the latch members to a third position so that the latch members engage male flange members of the bottom container, top container and cover prevents access to both the bottom and top containers. When in the third position, the latch members may include plates having holes that align with a corresponding plate on the bottom container to permit the post of a lock to be inserted through the plates to secure the containers in the closed position.

For use by hunters, the top container may include a pair of stand members for permitting a bow or other elongated devices to be stored. In one embodiment, the cover may include a pair of elongated openings to permit the stand members to extend through the cover, while permitting the cover to be rotated between an open and closed position. The stand members may also be removable for storage, wherein the cover may not have any openings.

The storage container assembly may also include one or more storage trays located on the exterior of the bottom container to permit storage of smaller items and, if necessary, dissipate strong scents or odors from those items.

It is therefore an object of the present invention to provide a new and improved portable storage container assembly that allows for separate containers to be selectively accessed.

A further object of the present invention is to provide a portable storage container assembly that provides for separate storage areas to vent scented objects.

Another object of the present invention is to provide a new and improved portable storage container assembly that provides secure storage for equipment for a bow hunter.

Yet another object of the present invention is to provide a new and improved portable storage container assembly that adds scent to equipment when stored.

A still further object of the present invention is to provide a portable storage container assembly that is easy and economical to manufacture.

Other objects, features and advantages of the invention will be apparent from the following detailed disclosure, taken in conjunction with the accompanying sheets of drawings, wherein like reference numerals refer to like parts.

DETAILED DESCRIPTION OF THE INVENTION

Figure 1:
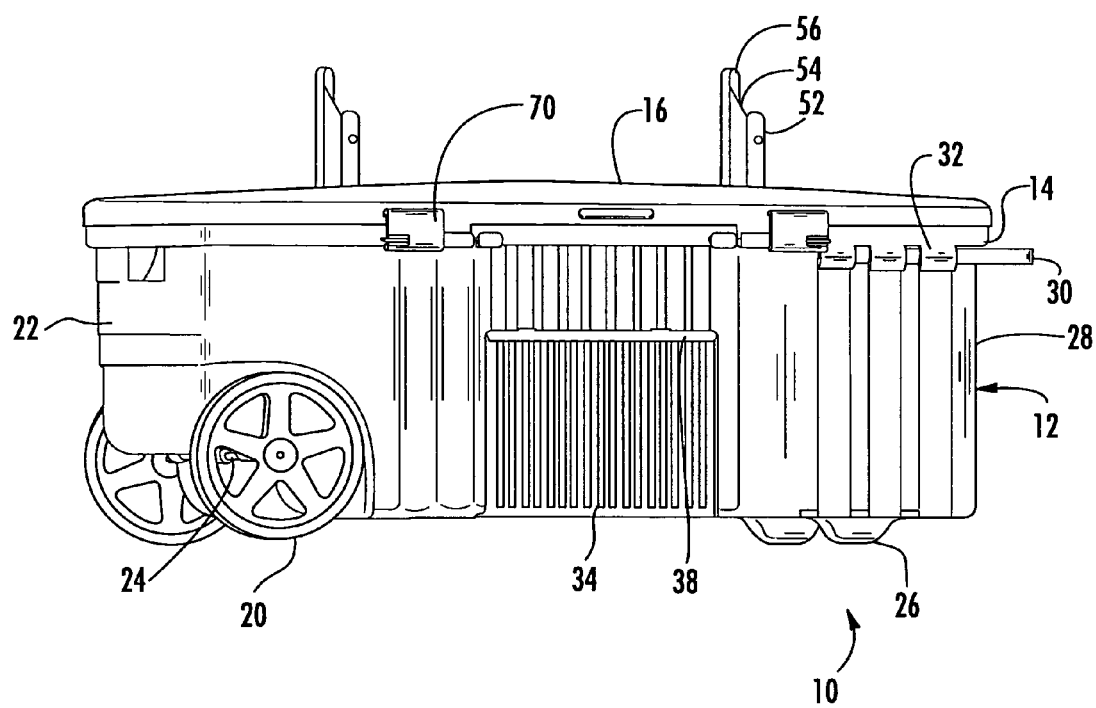
FIG. 1 is a perspective view of one embodiment of a portable storage container assembly of the present invention showing the latch members in third or locked position.

While this invention is susceptible of embodiment in many different forms, there is shown in the drawings and will herein be described in detail several specific embodiments, with the understanding that the present disclosure is to be considered merely an exemplification of the principles of the invention and the application is limited only to the claims.

Referring now to the drawings, and particularly to FIGS. 1 through 6, there is shown a preferred embodiment of the present invention. The portable storage container assembly, generally designated by the number 10, is shown as having a bottom container 12, a top container 14 that is preferably pivotally connected to the bottom container 12, and a cover 16 that is preferably pivotally connected to the top container. The storage container assembly is preferably made of a durable and weather-proof material such as, but not limited to, a thermoplastic.

The bottom container 12 includes a plurality of walls that form a cavity to provide storage. A pair of wheels 20 are operably attached to the rear end 22 of the bottom container 12 in a known way, such as, but not limited to, by an axle 24 that may be slid through one or more sleeves or loops that are attached to the bottom container 12. A pair of legs 26 are preferably located toward the front end 28 of the bottom of the bottom container 12. The legs preferably extend a distance that is substantially equal to the distance the wheels extend below the bottom of the bottom container so that the storage container assembly may rest substantially parallel to the ground when the storage container assembly is in a resting position. It is also appreciated that the storage container assembly may also include one or more wheels at the front end 28 of the bottom container 12 in place of the legs 26 and not depart from the scope of the present invention.

In order to assist in moving the storage container assembly, a handle 30 is preferably attached to the front end 28 of the bottom container 12. As shown in FIG. 1, the legs of the handle may be slid into a plurality of sleeve members 32 and attached to the bottom container 12 in a known way. While the handle 30 is preferably fixed in place, it is appreciated that the handle 30 may be retractable or removably attachable to the storage container assembly 10 and not depart from the scope of the present invention.

Referring again to FIG. 4, the bottom container 12 may also include one or more storage trays 34 that include one or more compartments 36 for storing smaller items. In the preferred embodiment, the storage trays 34 are hingedly connected to the bottom container 12 in a known way. In order to facilitate the opening and closing of the storage tray 34, a lip, handle or the like 38 may extend outward from about the top of the storage tray 34. Where the storage trays are designed to store items that may have a strong scent, it is appreciated that the storage trays may provide for additional ventilation by including, among other things, slots 39 to permit air to circulate to assist in dissipating the scent.

The cavity of the bottom container may also include one or more partition walls 40 that may be used to divide the cavity into separate compartments for storage, as well as provide support for the top container 14 when the top container is in the closed position. The cavity of the bottom container 12 may also include a compartment, holder or chamber 42 for placing scented objects or liquids to distribute a cover scent to add scent to equipment or other objects after their use. In a preferred embodiment, it is appreciate that the compartment 42 may be enclosed with a top that may be removably locked or sealed in place by a screw, clasp or other known means. It is also appreciated that the top container 14 may also include a compartment, holder or chamber for placing scented objects or liquids to assist in distributing cover scent to equipment and objects stored therewithin. It is also appreciated that the bottom container may contain a port 44 and corresponding plug 46 to selectively permit drainage of fluids of the bottom container.

The top container 14 is preferably hingedly connected to the bottom container 12 in a known way to permit the top container 14 to be rotated into and out of engagement with the bottom container 12. In the preferred embodiment, the base of the top container 14 is shaped to fit within the walls of the bottom container 12. Access to the top container 14 is provided by a cover 16 that is preferably hingedly connected to the top container 14 in a known way. In a preferred embodiment, in order to accommodate equipment for a bow hunter, the top container preferably includes a pair of slots 50 for receiving a pair of stand members 52 for resting a bow or other elongated equipment. The stand members preferably include angled tops 54 that are recessed from the tops of the sides 56 of the stand members 52 to assist in retaining the bow or other equipment on the stand members 52; however, it is appreciated the stand members 52 may be of a variety of shapes or include grooves or slots for receiving parts of the equipment and not depart from the scope of the present invention. It is also appreciated that the top container may contain a port 64 and corresponding plug 66 to selectively permit drainage of fluids of the top container.

In one embodiment, the cover 16 may include a pair of elongated slotted openings 58 that are aligned with the stand members 52 to permit the cover 16 to be opened and closed. While a cover 16 having a pair of elongated slotted openings 58 is shown, it is appreciated that the cover 16 may by integrally formed without any openings and not depart from the scope of the present invention. In that embodiment, it is appreciated that the stand members 52 may be removably received in the slots 50 and stored in either the top 14 or bottom container 12. It is also appreciated that cover 16 may include an additional storage area for providing easy access to certain items such as arrows, or for additional storage.

Figure 7:
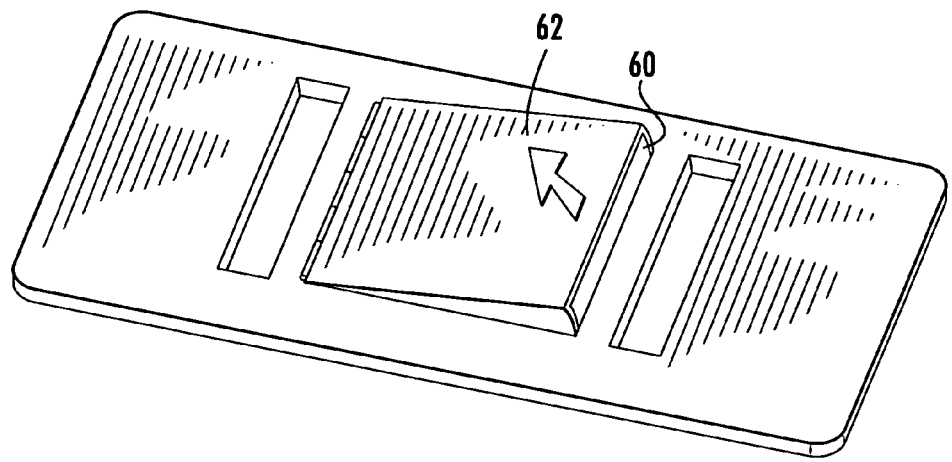
FIG. 7 is a perspective view of an alternate embodiment of the cover showing an accessible box contained therein in the open position.

Such storage areas may include a recessed area and separate cover, or, as shown in FIG. 7, a box or container 60 hingedly attached to the cover 16 so that it may be rotated into an open position to allow items to be stored or removed from the container 60. When closed, the top or cover 62 of the container preferably is flush with the cover. A handle, recessed notch or other grasping device may be provided to assist in opening the container.

Figure 2:
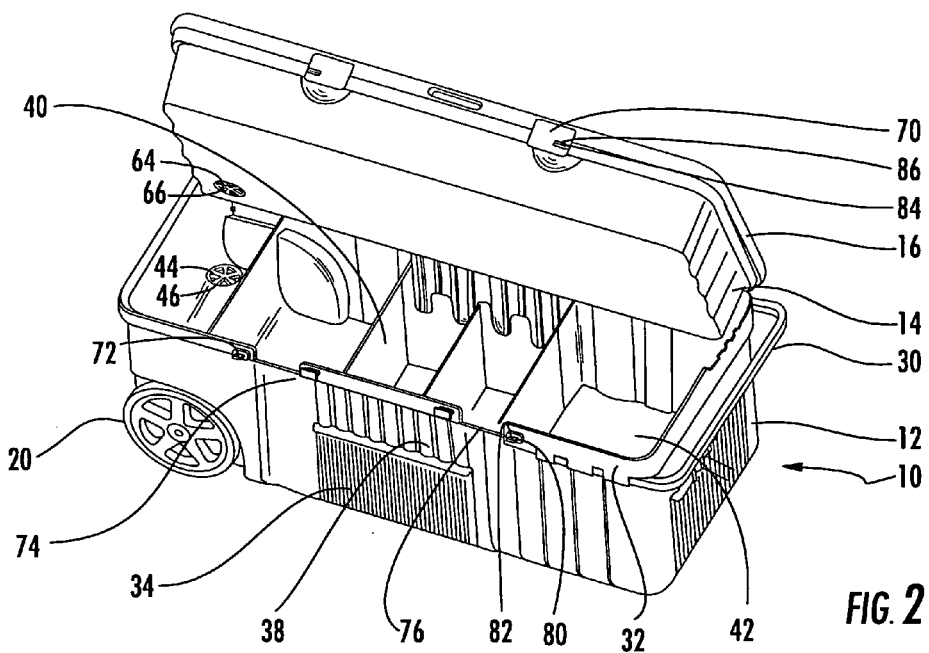
FIG. 2 is a perspective view of the portable storage container assembly shown in FIG. 1 illustrating the latch members in a second position and the top container being pivoted to provide access to the contents of the bottom container.
Figure 4:
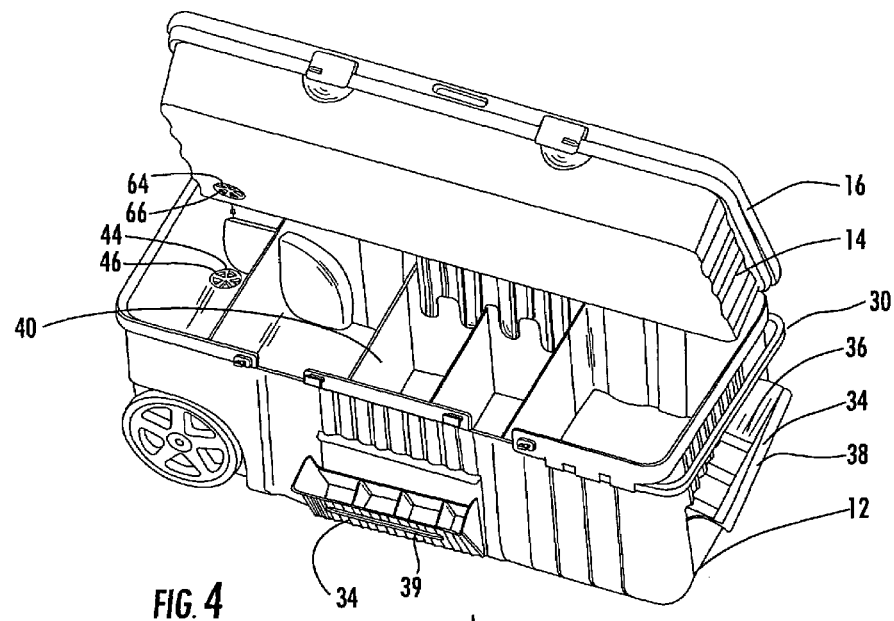
FIG. 4 is a perspective view of the portable storage container assembly shown in FIG. 1 illustrating a pair of trays on the bottom container in an opened position.

To selectively secure and access the bottom 12 and top containers 14, the storage container assembly 10 preferably includes a pair of sliding latch members 70 that are operably attached to the top container 14 and cooperate with male flange members 72, 74 extending from the bottom container 12, as well as male flange members 94 extending from the top container 14 and male flange members 90 extending from the cover 16. While a pair of latch members are shown and disclosed, it is appreciated that one latch member or multiple latch members may be used and not depart from the scope of the present invention. In a preferred embodiment, the male flange members 72, 74, 90, 94 have a substantially T-shaped cross section to permit the bottom of substantially C-shaped latch members 70 to matingly engage the male flange members to permit the latch members 70 to slide and prevent them from being removed. FIGS. 2 and 4 illustrate the latch members being moved so that the latch members 70 align with and engage male flange members 90, 94 to permit the top container 14 and cover 16 to rotate to provide access to the contents of the bottom container 12. It is appreciated that the bottom container may include openings 76 to accommodate the male flange members 94 of the top container 14 when it is in the closed position. The latch members 70 preferably are snapingly engaged so that they will be prevented from being removed from the male flange members 90, 94 when the top container 14 is in the raised or open position.

Figure 3:
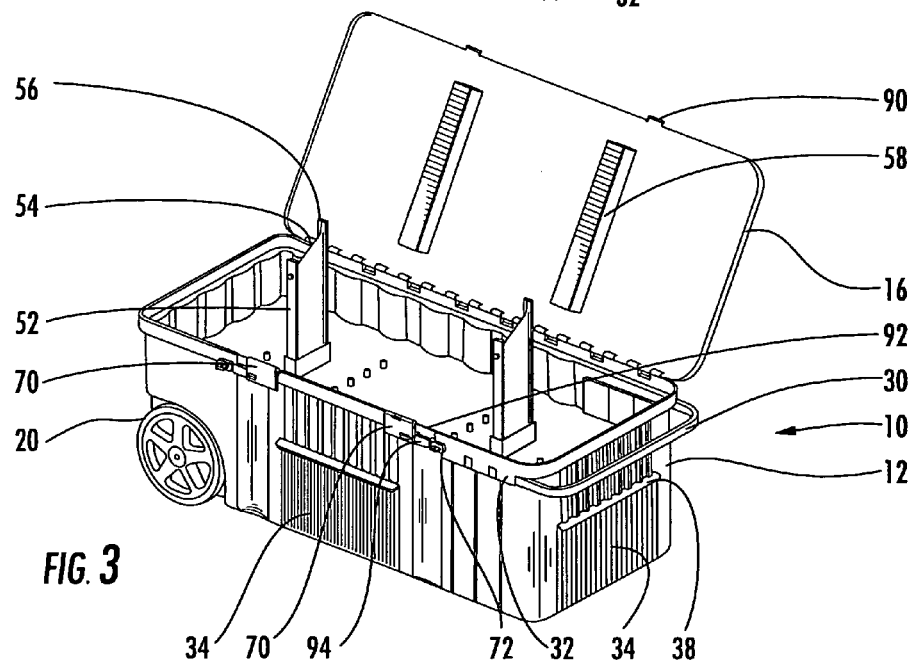
FIG. 3 is a perspective view of the portable storage container assembly shown in FIG. 1 showing the latch members in a first position and the cover of the top container being pivoted to provide access to the contents of the top container.

The latching members 70, as shown in FIG. 3, may also be slid to engage the male flange members 74, 94 whereby the latching members will disengage male flange members 90 of the cover 16 to permit the cover 16 to rotate to an opened position. With the cover 16 in the closed position, each male flange member 90 preferably rests within an opening 92 so that the male flange member 70 may be engaged by the latching member 90 to prevent the cover 16 from being rotated.

Figure 5:
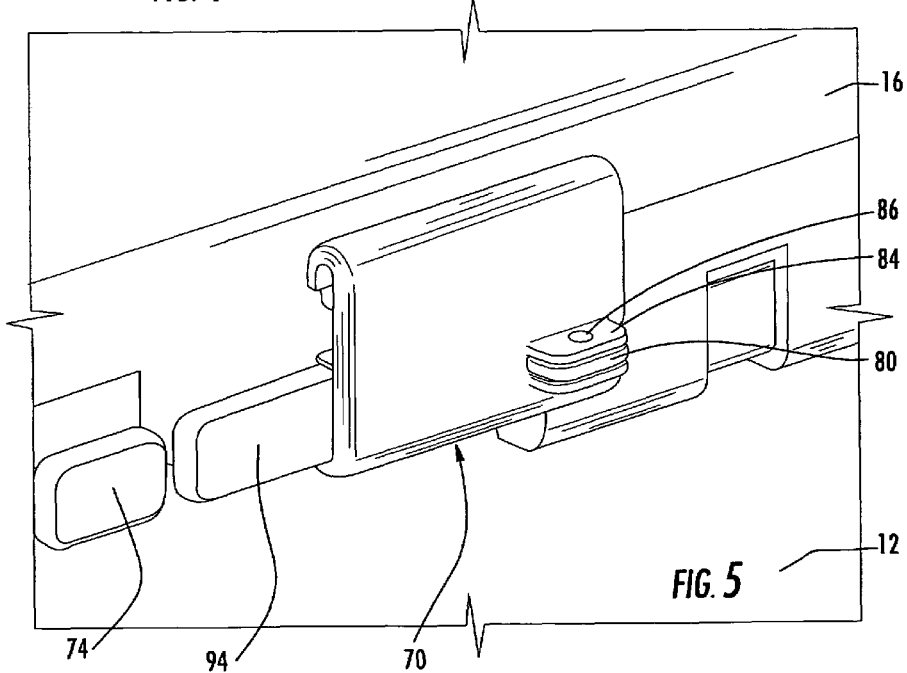
FIG. 5 is a partial view of the top container of the storage container assembly shown in FIG. 1 showing one of the latch members in the third or locked position.
Figure 6:
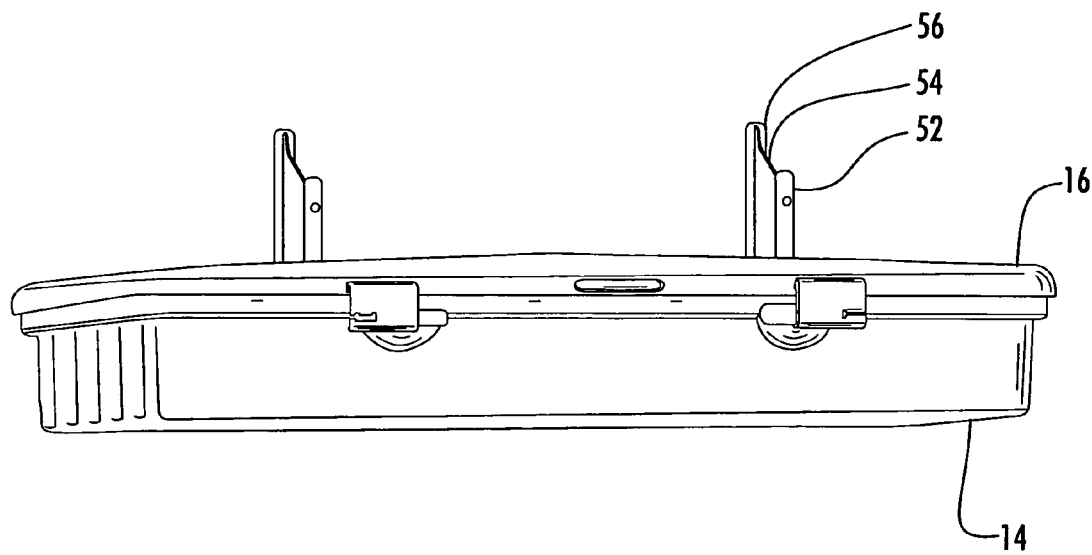
FIG. 6 is a perspective view of the top container of the storage container assembly shown in FIG. 1.

Referring to FIG. 5, the latch members 70 may also be slid outwardly so that they engage male flange members 72, 90, 94. In this position, the top container 14 and cover 16 are both in locked position and prevented from being rotated or opened. The latch members 70 may also include plates 80 having holes 82 that may be aligned with one or more plates 84 having corresponding holes 86, so that a lock, pin or other device may be inserted through the holes to lock the storage container assembly and prevent access to the contents of the containers. It is appreciated that the storage container assembly preferably includes stops to limit the movement of the latching members to operate between the male flange members.

In operation, the storage container assembly allows for equipment, supplies or other contents to be stored in separate containers of the storage container assembly. Using the latch members 70 to engage the respective male flange members 72, 74, 90, 94 associated with the bottom container 12, top container 14 and/or cover 16 allows only one of the containers 12, 14 to be accessed at any given time. In one position, the latch members 70 may be moved or slid to engage the male flange members 74, 90, 94 and disengage the male flange members 90, thereby allowing only the cover 16 to be rotated to permit access to the top container 14. When the cover 16 is opened, a bow or other items may be placed and stored on the stand members 52. Access to the bottom container 12 may be achieved by sliding or moving the latch members 70 so that they disengage the male flange members 74. Moving the latch members 70 so that they engage male flange members 72, 90, 94 will prevent the top container 14 and cover 16 from being rotated to prevent access to the contents of the bottom 12 and top containers 14. A post of a lock may then be inserted through the holes 82, 86 on the plates 80, 84 associated with male flange members 72 and the latch members 70. Additional items may also be placed in storage trays 34 by pulling on the handle or lip 30 to open the trays 34.

It will be understood that modifications and variations may be effected without departing from the scope of the novel concepts of the present invention, but it is understood that this application is limited only by the scope of the appended claims.

The invention claimed is:

1. A portable storage container assembly comprising:
a bottom container comprising a front end, a rear end, a first side wall and a second side wall that define a cavity for storing contents, and a male flange member extending outwardly from the bottom container;
a top container rotatably attached to the bottom container and comprising a male flange member extending outwardly from the top container;
a cover rotatably attached to the top container and comprising a male flange member extending outwardly from the cover;
a latch member that may be moved laterally to selectively engage the male flange members of the bottom container, the top container and/or the cover to selectively provide access to the bottom container and the top container.

2. The portable storage container assembly of claim 1 which further comprises a pair of wheels operably attached to the rear end of the bottom container.

3. The portable storage container assembly of claim 2 which further comprises a pair of leg members located proximate to the front end of the bottom container.

4. The portable storage container assembly of claim 1 which further comprises a handle attached to the bottom container.

5. The portable storage container assembly of claim 4 wherein the handle is retractable.

6. The portable storage container assembly of claim 4 wherein the handle is removable.

7. The portable storage container assembly of claim 1 wherein the latch member comprises a plate having a hole extending therethrough, and the male flange member of the bottom container comprises a plate having a hole extending therethrough, wherein the holes of the plates may be aligned to permit a lock to be inserted to secure the assembly in a locked position.

8. The portable storage container assembly of claim 1 wherein the portable storage container assembly is made from a thermoplastic.

9. The portable storage container assembly of claim 1 wherein the top container comprises a bottom, and which further comprises a pair of stand members extending substantially upwardly from the bottom of the top container.

10. The portable storage container assembly of claim 9 wherein the pair of stand members are removable.

11. The portable storage container assembly of claim 9 wherein the cover comprises a pair of elongated openings that align with the pair of stand members to permit the cover to be opened and closed when the stand members are in use.

12. The portable storage container assembly of claim 1 which further comprises a storage tray located on at least one of the front end, rear end, first side wall or second side wall of the bottom container.

13. The portable storage container assembly of claim 1 wherein the storage tray is rotatably attached to the bottom container to permit the tray to be rotated between a closed and an open position.

14. The portable storage container assembly of claim 1 wherein the bottom container comprises means to distribute a cover scent to the contents.

15. The portable storage container assembly of claim 14 wherein the means to distribute a cover scent comprises a compartment that houses a scented object.

16. The portable storage container assembly of claim 14 wherein the means to distribute a cover scent comprises a compartment that houses a scented liquid.

17. The portable storage container assembly of claim 1 which further comprises a tray accessible from one of the front end, rear end, first sidewall or second sidewall of the bottom container.

18. The portable storage container assembly of claim 1 wherein the cover further comprises a covered enclosure for accessing items stored therewithin.

19. The portable storage container assembly of claim 1 wherein the bottom container contains a port and a plug for selectively dispensing liquid from the bottom container.

20. The portable storage container assembly of claim 1 wherein the top container contains a port and a plug for selectively dispensing liquid from the top container.

21. A portable storage container assembly comprising:

a bottom container comprising a front end, a rear end, a first side wall and a second side wall that define a cavity for storing contents, and a male member extending outwardly from the bottom container;

a top container rotatably attached to the bottom container and comprising a male member extending outwardly from the top container;

a cover rotatably attached to the top container and comprising a male member extending outwardly from the cover; and a latch member that may be moved laterally to: a first position to engage the male members of the bottom container and the top container to provide access to the top container; a second position to engage the male members of the top container and the cover to provide access to the bottom container; and a third position to engage the male members of the bottom container and the cover to prevent access to the bottom container and the top container.

* * * * *